(12) United States Patent
Kaufman et al.

(10) Patent No.: US 11,928,494 B2
(45) Date of Patent: *Mar. 12, 2024

(54) CONFIGURATION TECHNIQUES FOR MANAGED VIRTUAL MACHINES

(71) Applicant: Microsoft Technology Licensing, LLC, Redmond, WA (US)

(72) Inventors: Peter J Kaufman, Sammamish, WA (US); Shayak Lahiri, Redmond, WA (US); Yi Zhao, Medina, WA (US); Go Komatsu, Sammamish, WA (US); Pieter Willem Wigleven, Redmond, WA (US); Randall R. Cook, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,689

(22) Filed: Apr. 15, 2022

(65) Prior Publication Data

US 2022/0374255 A1 Nov. 24, 2022

Related U.S. Application Data

(63) Continuation of application No. 16/894,082, filed on Jun. 5, 2020, now Pat. No. 11,334,381.

(51) Int. Cl.
*G06F 9/455* (2018.01)
*G06F 9/445* (2018.01)
*G06F 9/54* (2006.01)

(52) U.S. Cl.
CPC ...... *G06F 9/45558* (2013.01); *G06F 9/44505* (2013.01); *G06F 9/542* (2013.01); *G06F 2009/45562* (2013.01); *G06F 2009/45595* (2013.01)

(58) Field of Classification Search
CPC .................................................. G06F 9/45558
See application file for complete search history.

(56) References Cited

U.S. PATENT DOCUMENTS

2011/0231696 A1* 9/2011 Ji ........................ G06F 11/1484
718/1

* cited by examiner

*Primary Examiner* — Charlie Sun

(57) ABSTRACT

Embodiments described herein are directed to configuring managed virtual machines. For instance, a management service (e.g., a mobile device manager) may provide configuration settings to a parent virtual machine. Upon successful application of the configuration settings, the parent virtual machine notifies a configuration service that it is in a steady state and provides the configuration settings to the configuration service. The configuration service notifies a cloud-based service (e.g., a virtual desktop service) that it is configured to instantiate virtual machines. The notification informs the cloud-based service that it is permitted to instantiate child virtual machines. Responsive to receiving the notification, the cloud-based service instantiates child virtual machine(s) as needed. To configure the child virtual machine(s), the configuration service provides the configuration settings received from the parent virtual machine to the child virtual machine(s), and the child virtual machine(s) configure themselves accordingly.

20 Claims, 5 Drawing Sheets

CONFIGURATION TECHNIQUES FOR MANAGED VIRTUAL MACHINES

CROSS-REFERENCE TO RELATED APPLICATIONS

This application is a continuation of U.S. application Ser. No. 16/894,082, now allowed, filed Jan. 5, 2020, the entirety of which is incorporated by reference herein.

BACKGROUND

Mobile device management (MDM) is one way to ensure employees stay productive and do not breach corporate policies. Many organizations control activities of their employees using MDM products/services and/or other management entities. Such products, services and/or entities primarily deal with corporate data segregation, securing emails, securing corporate documents on devices, enforcing corporate policies, and integrating and managing mobile devices, including laptops and handhelds of various categories, as well as emulated computing devices (i.e., virtual machines). Such techniques reduce various security risks by ensuring that both computing devices issued by the organization and third-party computing devices that are allowed into the organization's network are configured in accordance with the organization's data and security policies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to configuring managed virtual machines. For instance, a management service (e.g., a mobile device manager) may provide configuration settings to a parent virtual machine. Upon successful application of the configuration settings, the parent virtual machine notifies a configuration service that it is in a steady state and provides the configuration settings to the configuration service. The configuration service notifies a cloud-based service (e.g., a virtual desktop service) that it is configured to instantiate virtual machines. The notification informs the cloud-based service that it is permitted to instantiate child virtual machines. Responsive to receiving the notification, the cloud-based service instantiates child virtual machine(s) as needed. To configure the child virtual machine(s), the configuration service provides the configuration settings received from the parent virtual machine to the child virtual machine(s), and the child virtual machine(s) configure themselves accordingly.

Further features and advantages of the disclosed embodiments, as well as the structure and operation of various embodiments, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
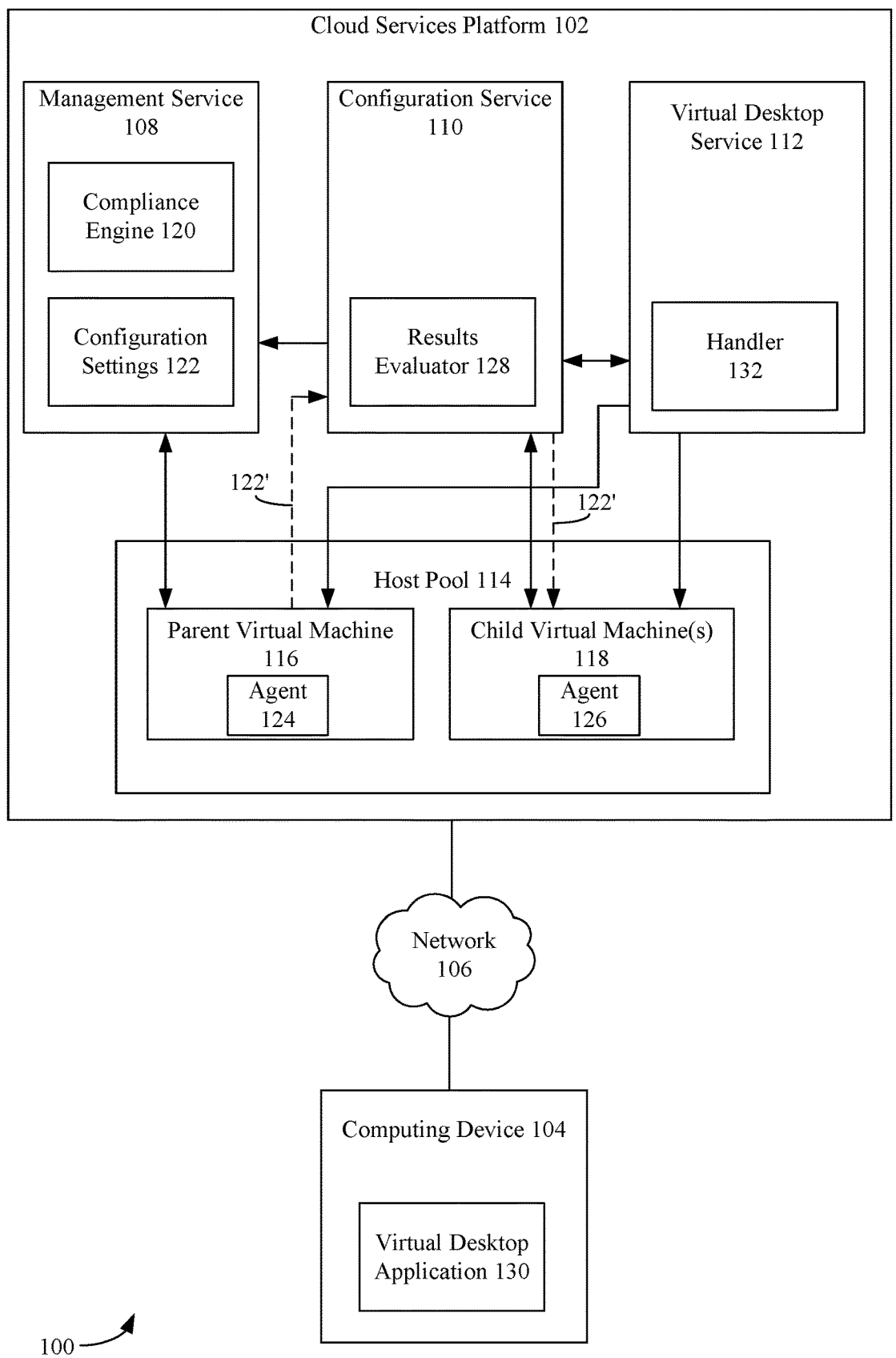
FIG. 1 depicts a block diagram of a system for managing and configuring virtual machines in accordance with an example embodiment.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System and Method for Configuring Managed Virtual Machines

Embodiments described herein are directed to configuring managed virtual machines. For instance, a management service (e.g., a mobile device manager) may provide configuration settings to a parent virtual machine. Upon successful application of the configuration settings, the parent virtual machine notifies a configuration service that it is in a steady state and provides the configuration settings to the configuration service. The configuration service notifies a cloud-based service (e.g., a virtual desktop service) that it is configured to instantiate virtual machines. The notification informs the cloud-based service that it is permitted to instantiate child virtual machines. Responsive to receiving the notification, the cloud-based service instantiates child virtual machine(s) as needed. To configure the child virtual machine(s), the configuration service provides the configuration settings received from the parent virtual machine to the child virtual machine(s), and the child virtual machine(s) configure themselves accordingly.

Instead of obtaining the configuration settings directly from the management service, the child virtual machines utilize the configuration settings made available via the configuration service, thereby bypassing the management service when configuring child virtual machines. Accordingly, the configuration service acts as a proxy to manage and configure the child virtual machines in a uniform manner on behalf of the management service. By having the configuration service act as a proxy, the time to configure the child virtual machines is greatly reduced, thereby enabling a user to utilize a child virtual machine much faster. In particular, management services generally utilize an OMA (Open mobile Alliance) device management protocol for transmitting configuration settings. Such a protocol requires a relatively large amount of handshaking between the management service and the child virtual machine(s) that are to be configured. Not only does this handshaking result in the delay of child virtual machine configuration, it increases the network traffic of the network. Moreover, this configuration delay effectively slows down the management service's ability to configure a large number of child virtual machines in a relatively short time frame.

FIG. 1 is a block diagram of a system 100 for managing and configuring virtual machines in accordance with an example embodiment. As shown in FIG. 1, system 100 includes a cloud services platform 102 and a computing device 104 that are communicatively coupled via a network 106. Network 106 may comprise one or more networks such as local area networks (LANs), wide area networks (WANs), enterprise networks, the Internet, etc., and may include one or more of wired and/or wireless portions. As used herein, the term "enterprise" broadly refers to any of a wide variety of organization types, including businesses, non-profit organizations, and government agencies. An enterprise network comprises a private computer network established by an enterprise for the purposes of interconnecting enterprise devices (e.g., computing device 104) at one or more enterprise locations to other enterprise devices and to enable enterprise devices to access and/or share computing resources. Users of computing device 104 may be referred to herein as "enterprise users" or simply "users". Each of computing device 104 may comprise, for example and without limitation, a desktop computer, a laptop computer, a tablet computer, a netbook, a smartphone, or the like.

In accordance with at least one embodiment, cloud services platform 102 comprises part of the Microsoft® Azure® cloud computing platform, owned by Microsoft Corporation of Redmond, Washington, although this is only an example and not intended to be limiting. As shown in FIG. 1, cloud services platform 100 comprises a management service 108, a configuration service 110, and a virtual desktop service 112. As further shown in FIG. 1, virtual desktop service 112 has allocated a host pool 114 of virtual machines 116 and 118. Virtual machine 116 represents the initial virtual machine instantiated by virtual desktop service 112. Virtual machines that are subsequently instantiated and similarly configured as parent virtual machine 116 are referred to and shown as child virtual machine(s) 118. Each of management service 108, configuration service 110, virtual desktop service 112, and host pool 114 may execute via one or more nodes (or servers) of cloud service platform 102 that are communicatively coupled via a network. In accordance with an embodiment each of configuration service 110 and virtual desktop service 112 are implemented as platform-based services (e.g., platform-as-a-service). An example of virtual desktop service 112 includes, but is not limited to Windows® Virtual Desktop published by Microsoft® Corporation of Redmond Washington.

Virtual desktop service 112 may instantiate a virtual machine responsive to a user requesting a virtual desktop session. For instance, as shown in FIG. 1, computing device 104 comprises and executes a virtual desktop client application 120. Virtual desktop client application 120 enables a user to connect to and utilize a particular virtual machine. For example, virtual desktop client application 130 may send a request via network 106 to virtual desktop service 112 to utilize a virtual machine. Responsive to receiving the request, virtual desktop service 112 assigns the user to a particular virtual machine. Initially, one or more users may be assigned to parent virtual machine 116. However, if parent virtual machine 116 is unable to support additional users (e.g., due to its load being over a predetermined threshold), virtual desktop service 112 instantiates a virtual machine that is a child of parent virtual machine (e.g., child virtual machine 118). Virtual desktop service 112 continues to instantiate child virtual machines 118 to support an increasing number of users, as needed.

Management service 108 may be configured to configure parent virtual machine 116 with respect to a policy (e.g., a data and/or security policy). The policy may be specified by an enterprise. Management service 108 may also be referred to as a mobile device manager (MDM). The policy may be specified in accordance with one or more compliance rule(s). For instance, management service 108 may comprise a compliance engine 120. Compliance engine 120 may determine configuration settings 122 to be provided to parent virtual machine 116 and provide the determined configuration(s) thereto. The determined configuration settings may comply with the compliance rule(s). The compliance rule(s) may be specified by an administrator of the enterprise (e.g., an IT administrator or other person within an enterprise who may be responsible for deploying, maintaining and/or configuring virtual machines 116 and 118 on behalf of enterprise users). Configuration settings 122 may be maintained by management service 108 (as shown in FIG. 1) or may be stored in a data store (not shown) communicatively coupled to management service 108.

Configuration settings 122 may specify one or more configuration settings for parent virtual machine 116.

Examples of configuration settings 122 include, but are not limited to, one or more encryption settings to be implemented by parent virtual machine 116, one or more security settings to be implemented by parent virtual machine 116, one or more network settings to be implemented by parent virtual machine 116, one or more application behavioral settings that affect that behavior of an application executing on parent virtual machine 116, a minimum version of at least one of an application or an operating system required to be installed on parent virtual machine 116, etc. The encryption setting(s) may specify whether storage allocated for parent virtual machine 116 is to be encrypted (e.g., via an encryption program, such as, but not limited to BitLocker™). The security setting(s) may specify a password policy to be implemented for parent virtual machine 116 (e.g., setting the password length to a minimum of 10 characters, 12 characters, etc.), whether code signing should be implemented by parent virtual machine 116, whether a trusted platform module (TPM) should be implemented by parent virtual machine 116, whether an anti-malware application is to be installed and/or activated on parent virtual machine 116, whether a firewall application is to be installed and/or activated on parent virtual machine 116, etc. The network setting(s) may specify network proxy settings to be implemented by parent virtual machine 116, network quality-of-service (QoS) settings to be implemented by parent virtual machine 116, network isolation settings to be implemented by parent virtual machine 116, etc. It is noted that the configuration settings described above are purely exemplary and that other configuration settings may be used.

Configuration settings 122 may have any suitable form. In accordance with an embodiment, configuration settings 122 are represented via a Synchronization Markup Language (SyncML) format.

Parent virtual machine 116 is configured to execute a configuration agent 124. Configuration agent 124 is configured to receive configuration settings 122 from management service 108. In accordance with an embodiment, the provision of configuration settings 122 by management service 108 is initiated by configuration agent 124. For example, configuration agent 124 may query (or "check-in" with) management service 108 to determine whether management service 108 comprises configuration settings 122 that are to be applied to parent virtual machine 116. Configuration agent 124 may query management service 108 on a periodic basis. However, the embodiments described herein are not so limited. For instance, configuration agent 124 may query management service 108 responsive to a command from a user. In accordance with another embodiment, the provision of configuration settings 124 by management service 108 is initiated by management service 108. For example, compliance engine 120 may determine that new configuration settings are to be provided to parent virtual machine 116 and provide (or "push") such settings to configuration agent 124.

Configuration agent 124 converts configuration settings 122 from the format in which configuration settings 122 are received (e.g., SyncML) into another format that is suitable for application to a plurality of child virtual machine(s) (e.g., child virtual machine(s) 118). In accordance with an embodiment, the format to which configuration settings 122 are converted is a Windows Declared Configuration (WinDC) format.

Configuration agent 124 determines the configuration settings from configuration settings 122 that are applicable thereto and configures itself accordingly. For example, configuration agent 124 may utilize and apply one or more filtering rules to configuration settings 122 to determine a subset of configuration settings that are to be applied thereto. Each filtering rule may comprise an indication as to whether a particular configuration setting of configuration settings 122 is to be applied to parent virtual machine 116. For instance, some configuration settings may be more applicable to physical computing devices rather than virtual machines. Management service 108 may not distinguish between physical computing devices and virtual machines, and thus, may provide configuration settings to virtual machines that are not applicable thereto. Thus, configuration agent 124 may utilize the filtering rule(s) to distinguish between physical computing device settings and virtual machine settings and apply the applicable configuration settings. The filtering rule(s) may be provided to parent virtual machine 116 by virtual desktop service 112.

After configuration settings 122 are applied to parent virtual machine 116 by configuration agent 124, configuration agent 124 provides a response to management service 108 that indicates that results of applying the configuration settings thereon. For instance, the results may indicate whether the application of configuration settings 122 was successful or failed. Upon receiving the response with results specifying that each of configuration settings 122 were successfully applied, compliance engine 120 designates parent virtual machine 116 as being in compliance with the compliance rule(s) and enables parent virtual machine 116 to access resources accessible via network 106 and/or cloud services platform 102. Upon receiving a response with results specifying that any of configuration settings 122 were not successfully applied, compliance engine 120 may determine that parent virtual machine 116 is not in compliance and/or prevent parent virtual machine 116 from accessing resources accessible via network 106 and/or cloud services platform 102. Examples of such resources include, but are not limited to an email server, a data repository, an application server, etc. Access to such resources may be prevented until parent virtual machine 116 is in compliance.

Configuration agent 124 provides an indication to configuration service 110 that parent virtual machine 116 is in a steady state and ready for utilization by a user upon successfully applying configuration settings 122 to parent virtual machine 116. Configuration agent 124 also provides the reformatted configuration settings received from management service 108 (shown as configuration settings 122') to configuration service 110. Responsive to receiving the indication and configuration settings 122', configuration service 110 provides a notification to virtual desktop service 112, which comprises a handler 132 configured to receive the notification. The notification indicates that virtual desktop service 112 is permitted to instantiate child virtual machine(s) 118 in host pool 114, as such virtual machine(s) may be properly configured with configuration settings 122'.

Accordingly, when virtual desktop service 112 receives a request to utilize a virtual machine from a virtual desktop application (e.g., virtual desktop application 130), virtual desktop service 112 will instantiate a child virtual machine (e.g., child virtual machine 118). Before instantiating the child virtual machine, virtual desktop service 112 may provide a notification to configuration service 110 that includes an identifier of the child virtual machine to be instantiated. Configuration service 110 utilizes the identifier to associate the results of the application of configuration settings 122' to the child virtual machine, as will be described below.

As further shown in FIG. 1, each of child virtual machine(s) 118 comprises a configuration agent 126. Configuration agent 126 is configured to configure its associated child virtual machine. For instance, configuration agent 126 provides a configuration request to configuration service 110. Responsive to receiving the configuration request, configuration service 110 provides a response comprising configuration settings 122' to configuration agent 126. Accordingly, configuration service 110 makes configuration settings 122' available to virtual machines subsequently instantiated for host pool 114 (i.e., child virtual machine(s) 118). Thus, instead of obtaining configuration settings 122' directly from management service 108, configuration agent 126 obtains configuration settings 122' from configuration service 110.

Configuration agent 126 utilizes configuration settings 122' made available via configuration service 110, determines the configuration settings therefrom that are applicable thereto, and configures itself accordingly. For example, configuration agent 126 may utilize and apply a filtering rule to configuration settings 122' to determine a subset of configuration settings that are to be applied to its associated child virtual machine. The filtering rule may be provided to configuration agent 126 by virtual desktop service 112. Each filtering rule may comprise an indication as to whether a particular configuration setting of configuration settings 122' is to be applied to a particular child virtual machine of child virtual machine(s) 118. For example, a rule may comprise an identifier of an anti-virus application (e.g., Windows® Defender, published by Microsoft® Corporation of Redmond Washington) and an indication as to whether the anti-virus application is to be configured for the child virtual machine. Configuration agent 126 analyzes the indication of each filtering rule to determine whether the corresponding configuration setting of configuration settings 122' is to be applied to its associated child virtual machine.

After configuration settings 122' are applied by configuration agent 126 of child virtual machine(s) 118, configuration agent 126 provides a response to configuration service 110 that indicates the results of applying the configuration settings thereon. For instance, the results may indicate whether the application of configuration settings 122' was successful or failed. The results may be associated with the identifier of the child virtual machine provided by virtual desktop service 112.

A results evaluator 128 of configuration service 110 is configured to analyze the received results to determine whether the configuration settings were successfully applied to the child virtual machine from which the results are received. Upon receiving the response from a child virtual machine of child virtual machine(s) 118 with results specifying that each of configuration settings 122' were successfully applied, results evaluator 128 of configuration service 110 designates the child virtual machine from which the response was received as being in a steady state (or healthy) and provides a notification to handler 132 of virtual desktop service 112 that the child virtual machine is in a steady state. Virtual desktop service 112 enables the usage of the child virtual machine by the user upon receiving such a notification.

Upon receiving a response with results specifying that one or more of the configuration settings were not successfully applied, results evaluator 128 may determine that the responding child virtual machine is not in a steady state and may provide a notification to handler 132 of virtual desktop service 112 indicating that the child virtual machine is not in a steady state. In response, virtual desktop service 112 may terminate the child virtual machine and/or instantiate a new child virtual machine.

In accordance with an embodiment, configuration service 110 may provide a notification to management service 108 of each child virtual machine of child virtual machine(s) 118 that is successfully instantiated. This enables management service 110 to track each virtual machine that is instantiated.

By having configuration service 110 act as a proxy, the time to configure the child virtual machine(s) 118 is greatly reduced, thereby enabling a user to utilize a child virtual machine much faster. In particular, the lengthy handshaking between the OMA device management protocol (i.e., SyncML) utilized by management service 108 and child virtual machine(s) 118 is avoided when transmitting configuration settings to each of child virtual machine(s) 116. Instead, each child virtual machine 118 obtains configuration settings 122', which have been converted into WinDC, and applies them accordingly.

Figure 2:
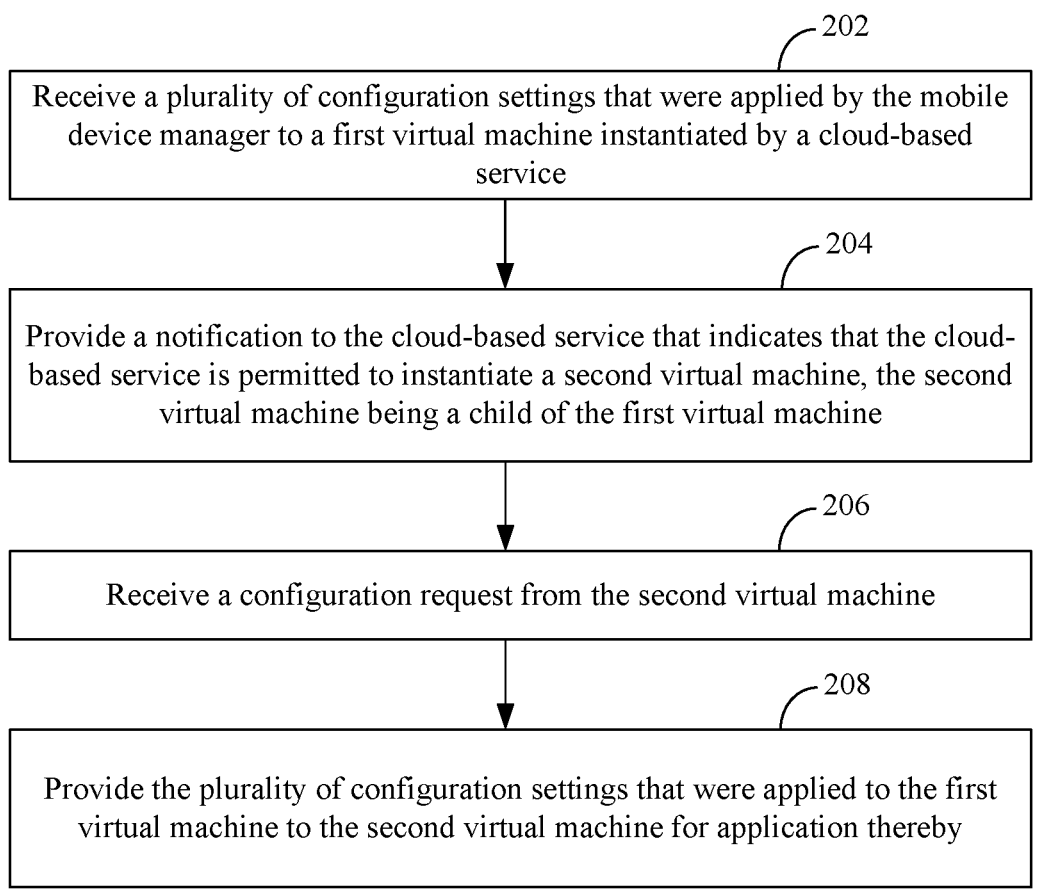
FIG. 2 depicts a flowchart of an example method for configuring virtual machines in accordance with an example embodiment.

Accordingly, virtual machines may be managed and configured in many ways. For example, FIG. 2 depicts a flowchart 200 of an example method performed by a configuration service for bypassing a mobile device manager during configuration of a child virtual machine in accordance with an example embodiment. The method of flowchart 200 will be described with continued reference to system 100 of FIG. 1, although the method is not limited to that implementation. Other structural and operational embodiments will be apparent to persons skilled in the relevant art(s) based on the discussion regarding flowchart 200 and system 100 of FIG. 1.

As shown in FIG. 2, the method of flowchart 200 begins at step 202, in which a plurality of configuration settings that were applied by the mobile device manager to a first virtual machine instantiated by a cloud-based service is received. For example, with reference to FIG. 1, configuration service 110 receives configuration settings 122', which were applied by management service 108 (i.e., a mobile device manager) to parent virtual machine 116 that was instantiated by virtual desktop service 112.

In accordance with one or more embodiments, the cloud-based service is a virtual desktop application platform-as-a-service (e.g., virtual desktop service 112).

In accordance with one or more embodiments, the plurality of configuration settings comprises at least one of a security setting that was implemented by the first virtual machine (e.g., parent virtual machine 116), a network setting that was implemented by the first virtual machine, an encryption setting that was implemented by the first virtual machine, or an application behavioral setting that was implemented by the first virtual machine.

At step 204, a notification is provided to the cloud-based service that indicates that the cloud-based service is permitted to instantiate a second virtual machine, the second virtual machine being a child of the first virtual machine. For example, with reference to FIG. 2, configuration service 110 provides a notification to virtual desktop service 112 that indicates that virtual desktop service 112 is permitted to instantiate a child virtual machine (e.g., child virtual machine 118). Additional details regarding the provision of the notification to virtual desktop service 112 is described below with reference to FIG. 3.

At step 206, a configuration request is received from the second virtual machine. For example, with reference to FIG. 1, configuration agent 126 of child virtual machine(s) 118 provides a configuration request to configuration service 110.

At step 208, the plurality of configuration settings that were applied to the first virtual machine are provided to the second virtual machine for application thereby. For example, with reference to FIG. 1, configuration service 110 provides configuration settings 122' (which were applied to parent virtual machine 116) to the requesting child virtual machine (e.g., child virtual machine(s) 118). Configuration agent 126 of the requesting child virtual machine applies configuration settings 122' to the child virtual machine.

In accordance with one or more embodiments, the second virtual machine is configured to apply a filtering rule to the plurality of configuration settings to determine a subset of configuration settings that are applicable to the second virtual machine. For example, with reference to FIG. 1, child virtual machine(s) 118 are configured to apply a filtering rule to configuration settings 122' to determine a subset of configuration settings that are applicable to the second virtual machine.

In accordance with one or more embodiments, the filtering rule is provided to the second virtual machine by the cloud-based service. For example, with reference to FIG. 1, the filtering rule is provided to child virtual machine(s) 118 by virtual desktop service 112.

Figure 3:
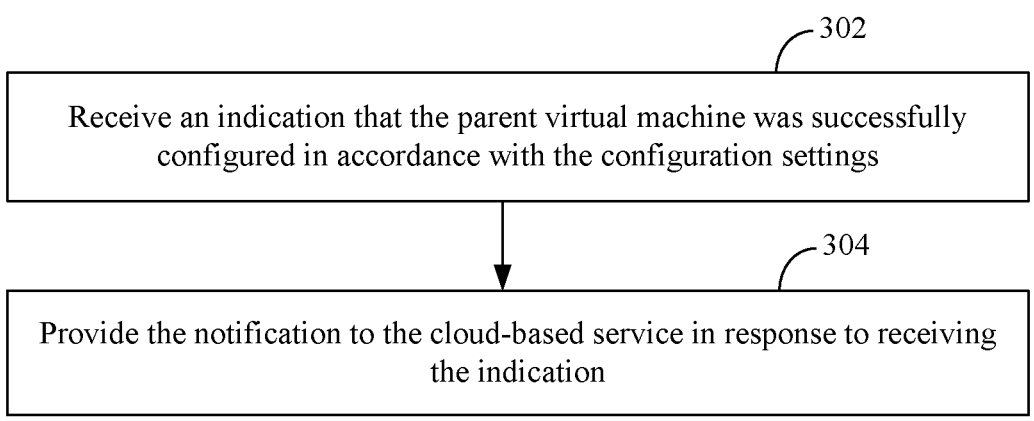
FIG. 3 depicts a flowchart of an example method for enabling a cloud-based service to instantiate child virtual machines in accordance with an example embodiment.

FIG. 3 depicts a flowchart 300 of an example method for enabling the cloud-based service to instantiate child virtual machines in accordance with an example embodiment. The method of flowchart 300 will be described with continued reference to system 100 of FIG. 1, although the method is not limited to that implementation. Other structural and operational embodiments will be apparent to persons skilled in the relevant art(s) based on the discussion regarding flowchart 300 and system 100 of FIG. 1.

As shown in FIG. 3, the method of flowchart 300 begins at step 302, in which an indication that the parent virtual machine was successfully configured in accordance with the configuration settings is received. For example, with reference to FIG. 1, configuration service 110 receives an indication that parent virtual machine 116 was successfully configured in accordance with configuration settings 122 from configuration agent 124.

At step 304, the notification to the cloud-based service is provided in response to receiving the indication. For example, with reference to FIG. 1, configuration service 110 provides the notification to virtual desktop service 112 in response to receiving the indication from configuration agent 124.

Figure 4:
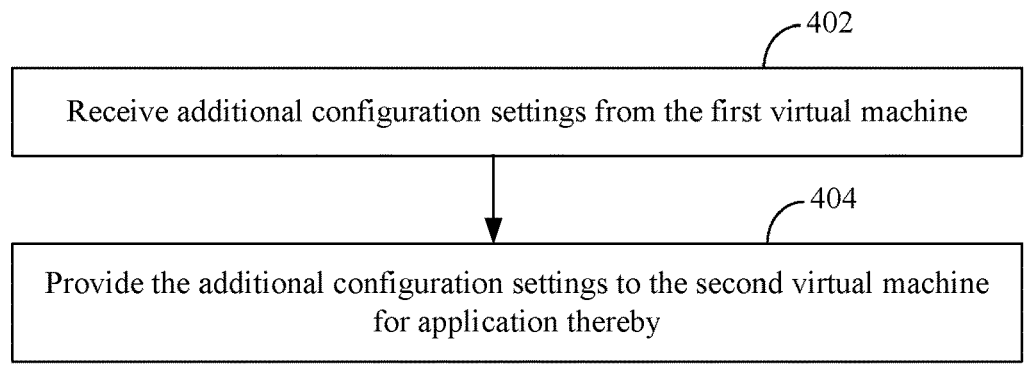
FIG. 4 depicts a flowchart of an example method for providing additional configuration settings to child virtual machines in accordance with an example embodiment.
Figure 5:
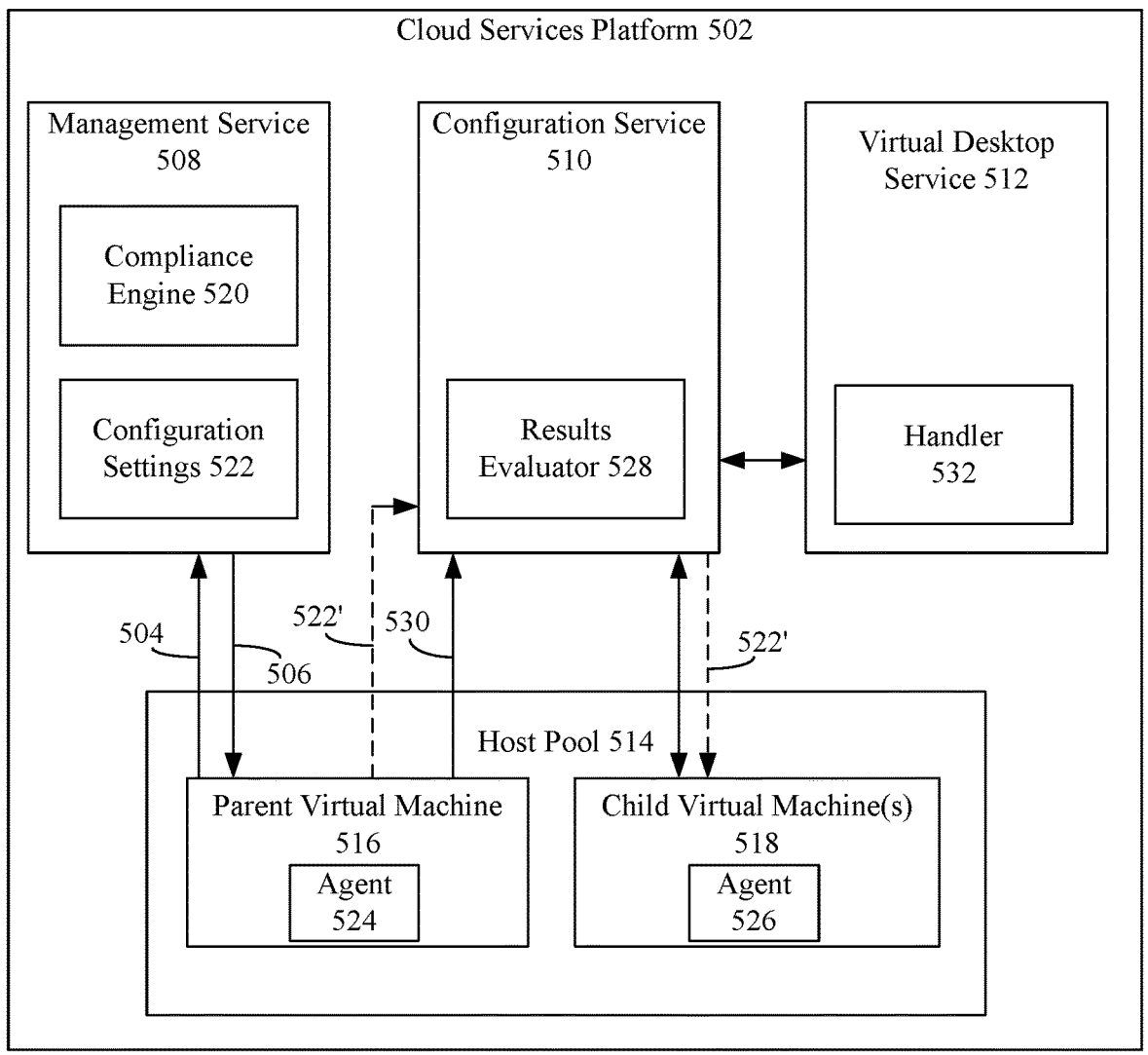
FIG. 5 depicts a block diagram of a system for configuring virtual machines with additional configuration settings in accordance with an example embodiment.

In accordance with one or more embodiments, parent virtual machine 116 may keep child virtual machine(s) 118 up to date with the most recent configuration settings made available by management service 108. For example, FIG. 4 depicts a flowchart of an example method 400 for providing additional configuration settings to child virtual machines in accordance with an example embodiment. The method of flowchart 400 will be described with reference to FIG. 5, although flowchart 400 is not limited to the implementation depicted therein. FIG. 5 is a block diagram of a system 500 for configuring virtual machines with additional configuration settings in accordance with an example embodiment. As shown in FIG. 5, system 500 comprises a cloud services platform 502, which is an example of cloud services platform 102, as described above with reference to FIG. 1. Cloud services platform 502 comprises a management service 508, a configuration service 510, a virtual desktop service 512, and a host pool 514. Management service 508, configuration service 510, virtual desktop service 512, and host pool 514 are examples of management service 108, configuration service 110, virtual desktop service 112, and host pool 114, as described above with reference to FIG. 1. Management service 508 comprises a compliance engine 520 and configuration settings 522, which are examples of compliance engine 120 and configuration settings 122, as described above with reference to FIG. 1. Configuration service 510 comprises a results evaluator 528, which is an example of results evaluator 128, as described above with reference to FIG. 1. Virtual desktop service 512 comprises a handler 532, which is an example of handler 132, as described above with reference to FIG. 1. Host pool 514 comprises parent virtual machine 516 and child virtual machine(s) 518, which are examples of parent virtual machine 116 and child virtual machine(s) 118, as described above with reference to FIG. 1. Parent virtual machine 516 comprises a configuration agent 524, and child virtual machine(s) 518 comprise a configuration agent 526, which are respective examples of configuration agent 124 and configuration agent 126, as described above with reference to FIG. 1. Other structural and operational embodiments will be apparent to persons skilled in the relevant art(s) based on the discussion regarding flowchart 400 and system 500 of FIG. 5.

As shown in FIG. 4, the method of flowchart 400 begins at step 402, in which additional configuration settings are received from the first virtual machine. For example, with reference to FIG. 5, configuration agent 524 may periodically provide a request 504 (or "check-in") with management service 508 for the latest or additional configuration settings (e.g., configuration settings 522). In the event that additional configuration settings are available, management service 508 provides a response 506 including the additional configuration settings to configuration agent 526. Configuration agent 524 applies the additional configuration settings to parent virtual machine 516 and, if successful, provides an indication 530 to configuration service 510 that the additional configuration settings were successfully applied to parent virtual machine 116. Configuration agent 526 also converts configuration settings 522 to a format suitable for application to a plurality of child virtual machines (e.g., WinDC) (shown as configuration settings 522') and provides the converted, additional configuration settings (e.g., configuration settings 522') to configuration service 510.

At step 404, the additional configuration settings are provided to the second virtual machine for application thereby. For example, with reference to FIG. 5, configuration service 510 provides (or broadcasts) configuration settings 522' to configuration agent 526 of each of child virtual machine(s) 518. Configuration agent 526 of each of child virtual machine(s) 518 applies the configuration settings to its associated child virtual machine.

Figure 6:
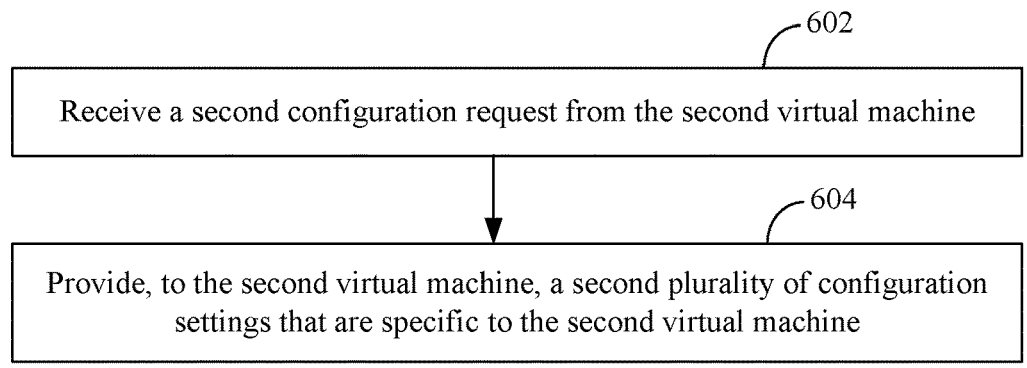
FIG. 6 depicts a flowchart of an example method for providing configuration settings that are specific to a particular child virtual machine to the child virtual machine in accordance with an example embodiment
Figure 7:
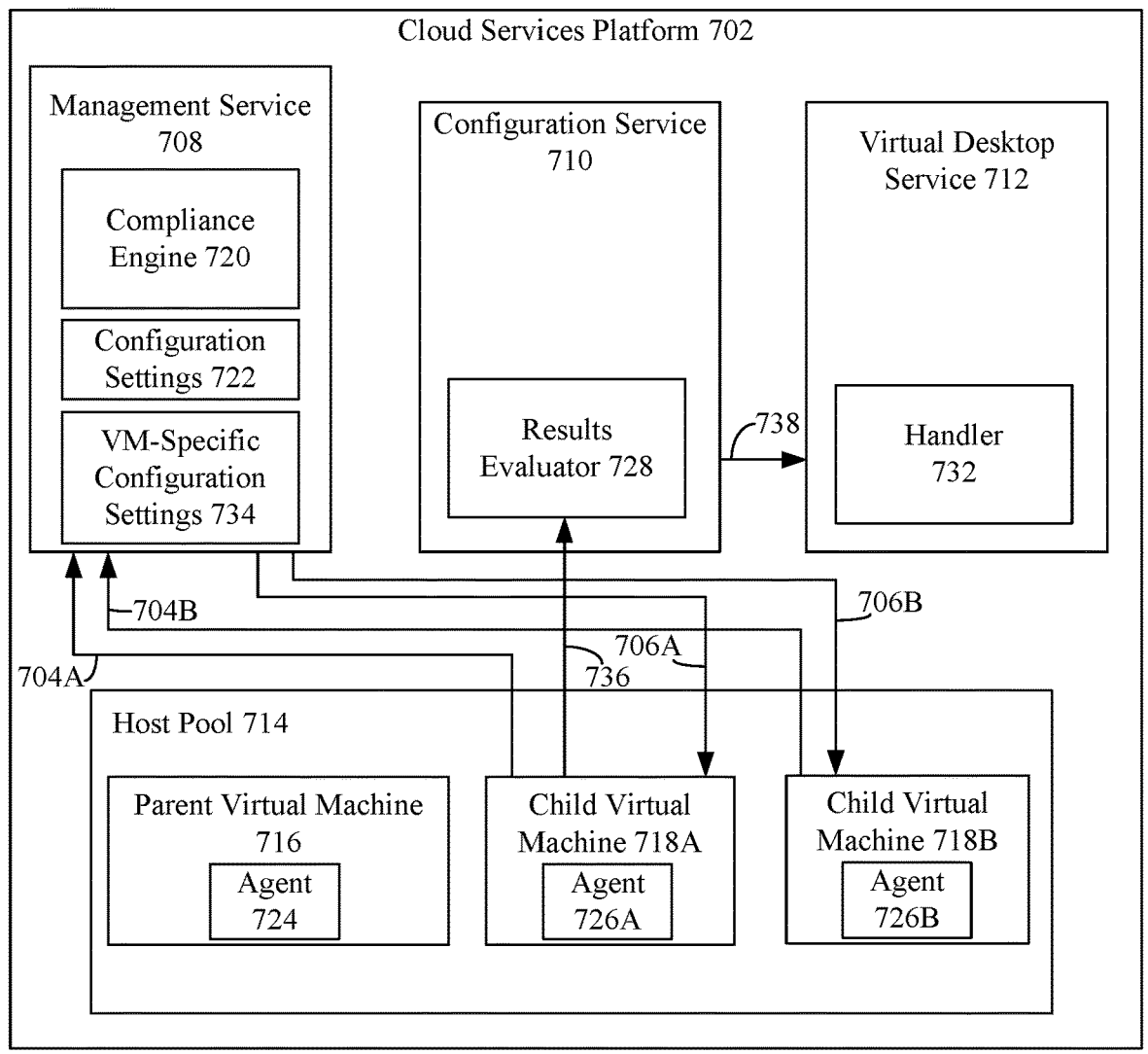
FIG. 7 depicts a block diagram of a system for configuring a child virtual machine with configuration settings that are specific thereto in accordance with an example embodiment.

In accordance with one or more embodiments, certain configurations are specific to a particular child machine are not suitable for global transmission to each instantiated child virtual machine. Examples of such configuration settings include, but are not limited to, certificates, virtual proxy network (VPN) settings, etc. Such configuration settings may be provided to the child virtual machine by the management service. For example, FIG. 6 depicts a flowchart 600 of an example method for providing configuration settings that are specific to a particular child virtual machine to the child virtual machine in accordance with an example embodiment. The method of flowchart 600 will be described with reference to FIG. 7, although flowchart 600 is not limited to the implementation depicted therein. FIG. 7 is a block diagram of a system 700 for configuring a child virtual machine with configuration settings that are specific thereto in accordance with an example embodiment. As shown in FIG. 7, system 700 comprises a cloud services platform 702, which is an example of cloud services platform 502, as described above with reference to FIG. 5. Cloud services platform 702 comprises a management service 708, a configuration service 710, a virtual desktop service 712, and a host pool 714. Management service 708, configuration service 710, virtual desktop service 712, and host pool 714 are examples of management service 508, configuration service 510, virtual desktop service 512, and host pool 514, as described above with reference to FIG. 5. Management service 708 comprises a compliance engine 720 and configuration settings 722, which are examples of compliance engine 520 and configuration settings 522, as described above with reference to FIG. 5. Management service 708 further comprises child virtual machine-specific configuration settings 734. Configuration service 710 comprises a results evaluator 728, which is an example of results evaluator 528, as described above with reference to FIG. 5. Virtual desktop service 712 comprises a handler 732, which is an example of handler 532, as described above with reference to FIG. 5. Host pool 714 comprises parent virtual machine 716 and a first child virtual machine 718A and a second child virtual machine 718B, which are respective examples of parent virtual machine 516 and child virtual machine(s) 518, as described above with reference to FIG. 1. Parent virtual machine 716 comprises a configuration agent 724, and child virtual machines 718A and 71B comprise a configuration agent 726A and a configuration agent 726B, respectively, which are respective examples of configuration agent 524 and configuration agent 526, as described above with reference to FIG. 5. Other structural and operational embodiments will be apparent to persons skilled in the relevant art(s) based on the discussion regarding flowchart 600 and system 700 of FIG. 7.

As shown in FIG. 6, the method of flowchart 600 begins at step 602, a second configuration request is received from the second virtual machine. For example, with reference to FIG. 7, configuration agent 726A of child virtual machine 718A and configuration agent 726B of child virtual machine 718B each query (or "check-in") with management service 708 to determine child virtual machine-specific configuration settings are available for child virtual machine 718A and child virtual machine 718B, respectively. Each of configuration agent 726A and configuration agent 726B may query management service 708 by sending a respective configuration request (i.e., configuration request 704A and configuration request 704B).

At step 604, a second plurality of configuration settings that are specific to the second virtual machine are provided to the second virtual machine. For example, with reference to FIG. 7, management service 708 may determine that child virtual machine-specific configuration settings (e.g., configuration settings 734) are available for child virtual machine 718A, but not for child virtual machine 718B. Accordingly, management service 708A may provide a response 706A to child virtual machine 718A comprising child virtual machine-specific configuration settings 734 and provide a response 706B to child virtual machine 718A indicating that child virtual machine-specific configuration settings are not available therefor. Configuration agent 726A of child virtual machine 718A may receive configuration settings 734 in accordance with a SyncML format. Configuration 726A may convert such settings 734 to WinDC and configure child virtual machine 718A with the converted configuration settings.

After configuration settings 734 are applied by configuration agent 726A of child virtual machine 726A, configuration agent 726A provides a response 736 to configuration service 710 that indicates the results of applying the configuration settings thereon. For instance, the results may indicate whether the application of configuration settings 734 was successful or failed.

Results evaluator 728 of configuration service 710 is configured to analyze the received results to determine whether the configuration settings were successfully applied to child virtual machine 718A. Upon receiving response 736 with results specifying that each of configuration settings 734 were successfully applied, results evaluator 728 of configuration service 710 designates child virtual machine 718A as being in a steady state (or healthy) and provides a notification 738 to handler 732 of virtual desktop service 712 that the child virtual machine is in a steady state.

If response 736 includes results specifying that one or more of configuration settings 734 were not successfully applied, results evaluator 728 may determine that child virtual machine 718A is not in a steady state and provide a notification to handler 732 of virtual desktop service 712 indicating that child virtual machine 718A is not in a steady state. In response, virtual desktop service 712 may terminate child virtual machine 718A and/or instantiate a new child virtual machine.

In accordance with one or more embodiment, the child virtual machine-specific configuration settings (e.g., child virtual machine-specific configuration settings 734) comprise at least one of a certificate to be applied by the second virtual machine (e.g., child virtual machine 718A) or a virtual proxy network setting to be implemented by the second virtual machine.

III. Example Computer System Implementation

The systems and methods described above, including the virtual machine management and configuration embodiments described in reference to FIGS. 1-7, may be implemented in hardware, or hardware combined with one or both of software and/or firmware. For example, management service 108, compliance engine 120, configuration service 110, results evaluator 128, virtual desktop service 112, handler 132, parent virtual machine 116, configuration agent 124, child virtual machine(s) 118, configuration agent 126, computing device 104, virtual desktop application 130, management service 508, compliance engine 520, configuration service 510, results evaluator 528, virtual desktop service 512, handler 532, parent virtual machine 516, configuration agent 524, child virtual machine(s) 518, configuration agent 526, management service 708, compliance engine 720, configuration service 710, results evaluator 728, virtual desktop service 712, handler 732, parent virtual machine 716, configuration agent 724, child virtual machine 718A, configuration agent 726A, child virtual machine 718B, and configuration agent 726B, and/or each of the components described therein, and flowchart 200, 300, 400, and/or flowchart 600 be each implemented as computer program code/instructions configured to be executed in one or more processors and stored in a computer readable storage medium. Alternatively, management service 108, compliance engine 120, configuration service 110, results evaluator 128, virtual desktop service 112, handler 132, parent virtual machine 116, configuration agent 124, child virtual machine(s) 118, configuration agent 126, computing device 104, virtual desktop application 130, management service 508, compliance engine 520, configuration service 510, results evaluator 528, virtual desktop service 512, handler 532, parent virtual machine 516, configuration agent 524, child virtual machine(s) 518, configuration agent 526, management service 708, compliance engine 720, configuration service 710, results evaluator 728, virtual desktop service 712, handler 732, parent virtual machine 716, configuration agent 724, child virtual machine 718A, configuration agent 726A, child virtual machine 718B, and configuration agent 726B, and/or each of the components described therein, and flowchart 200, 300, 400, and/or flowchart 600 may be implemented as hardware logic/electrical circuitry. In an embodiment, management service 108, compliance engine 120, configuration service 110, results evaluator 128, virtual desktop service 112, handler 132, parent virtual machine 116, configuration agent 124, child virtual machine(s) 118, configuration agent 126, computing device 104, virtual desktop application 130, management service 508, compliance engine 520, configuration service 510, results evaluator 528, virtual desktop service 512, handler 532, parent virtual machine 516, configuration agent 524, child virtual machine(s) 518, configuration agent 526, management service 708, compliance engine 720, configuration service 710, results evaluator 728, virtual desktop service 712, handler 732, parent virtual machine 716, configuration agent 724, child virtual machine 718A, configuration agent 726A, child virtual machine 718B, and configuration agent 726B, and/or each of the components described therein, and flowchart 200, 300, 400, and/or flowchart 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
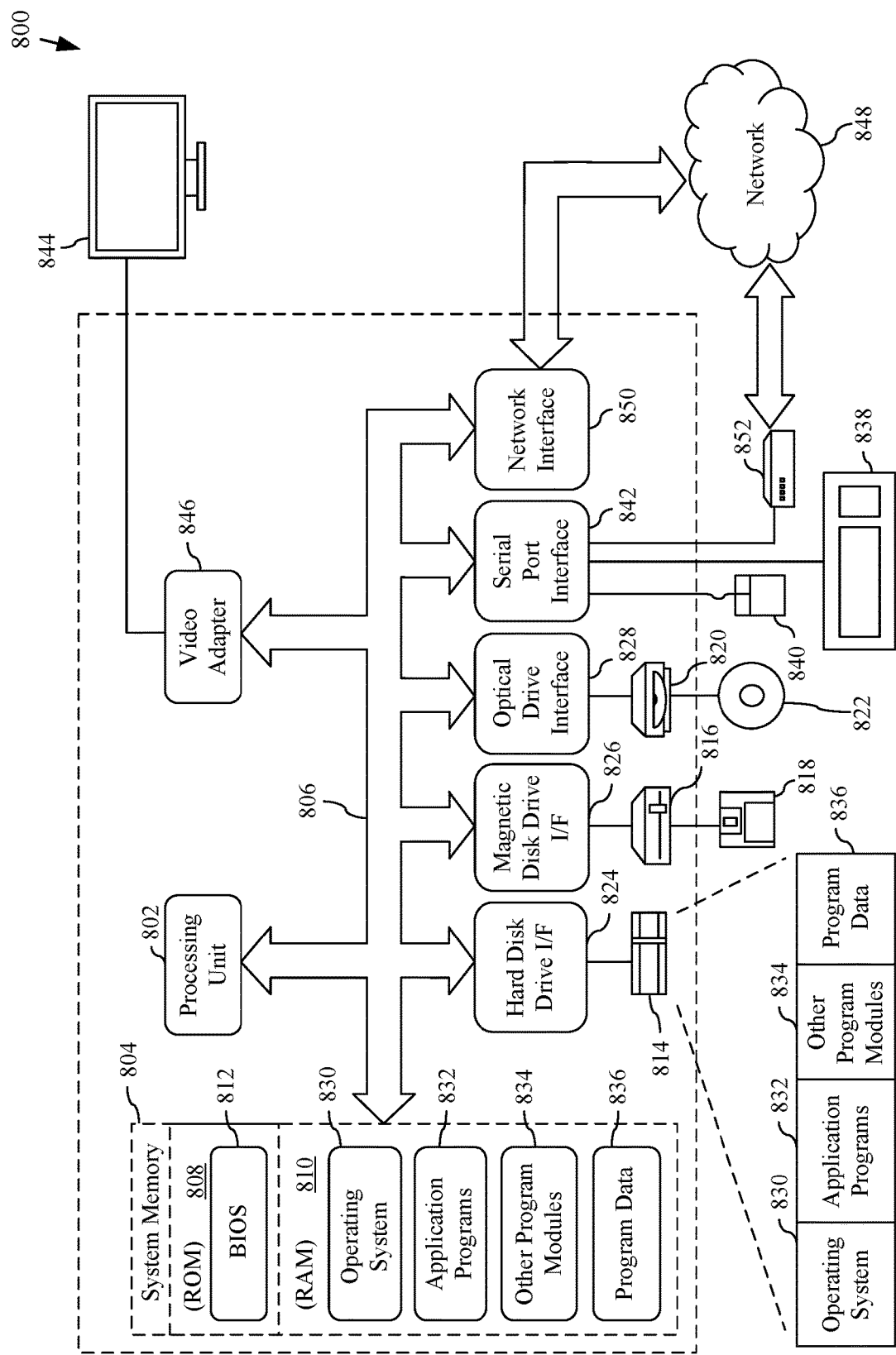
FIG. 8 is a block diagram of an example computing device that may be used to implement embodiments.

FIG. 8 depicts an exemplary implementation of a computing device 800 in which embodiments may be implemented, management service 108, compliance engine 120, configuration service 110, results evaluator 128, virtual desktop service 112, handler 132, parent virtual machine 116, configuration agent 124, child virtual machine(s) 118, configuration agent 126, computing device 104, virtual desktop application 130, management service 508, compliance engine 520, configuration service 510, results evaluator 528, virtual desktop service 512, handler 532, parent virtual machine 516, configuration agent 524, child virtual machine (s) 518, configuration agent 526, management service 708, compliance engine 720, configuration service 710, results evaluator 728, virtual desktop service 712, handler 732, parent virtual machine 716, configuration agent 724, child virtual machine 718A, configuration agent 726A, child virtual machine 718B, and configuration agent 726B, and/or each of the components described therein, and flowchart 200, 300, 400, and/or flowchart 600. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the device management and configuration embodiments described in reference to FIGS. 1-6.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A method performed by a configuration service for bypassing a mobile device manager during configuration of a child virtual machine is described herein. The method includes: receiving a plurality of configuration settings that were applied by the mobile device manager to a first virtual machine instantiated by a cloud-based service; providing a notification to the cloud-based service that indicates that the cloud-based service is permitted to instantiate a second virtual machine, the second virtual machine being a child of the first virtual machine; receiving a configuration request from the second virtual machine; and providing the plurality of configuration settings that were applied to the first virtual machine to the second virtual machine for application thereby.

In an embodiment of the method, providing the notification to the cloud-based service comprises: receiving an indication that the parent virtual machine was successfully configured in accordance with the configuration settings; and providing the notification to the cloud-based service in response to receiving the indication.

In an embodiment of the method, the method further comprises: receiving additional configuration settings from the first virtual machine; and providing the additional configuration settings to the second virtual machine for application thereby.

In an embodiment of the method, the method further comprises: the cloud-based service is a virtual desktop application platform as a service.

In an embodiment of the method, the plurality of configuration settings comprises at least one of: a security setting that was implemented by the first virtual machine; a network setting that was implemented by the first virtual machine; an encryption setting that was implemented by the first virtual machine; or an application behavioral setting that was implemented by the first virtual machine.

In an embodiment of the method, the second virtual machine is configured to apply a filtering rule to the plurality of configuration settings to determine a subset of configuration settings that are applicable to the second virtual machine.

In an embodiment of the method, the filtering rule is provided to the second virtual machine by the cloud-based service.

A system for bypassing a mobile device manager during configuration of a child virtual machine is also described herein. The system comprises: one or more servers, each of the one or more servers comprising at least one processor circuit and a memory that stores instructions for execution by the at least one processor circuit to configure the one or more servers to perform operations, the one or more servers comprising a configuration service, the configuration service configured to: receive a plurality of configuration settings that were applied by the mobile device manager to a first virtual machine instantiated by a cloud-based service; provide a notification to the cloud-based service that indicates that the cloud-based service is permitted to instantiate a second virtual machine, the second virtual machine being a child of the first virtual machine; receive a configuration request from the second virtual machine; and provide the plurality of configuration settings that were applied to the first virtual machine to the second virtual machine for application thereby.

In an embodiment of the system, the configuration service is further configured to: receive an indication that the parent virtual machine was successfully configured in accordance with the configuration settings; and provide the notification to the cloud-based service in response to receiving the indication.

In an embodiment of the system, the configuration service is further configured to: receive additional configuration settings from the first virtual machine; and provide the additional configuration settings to the second virtual machine for application thereby.

In an embodiment of the system, the cloud-based service is a virtual desktop application platform as a service.

In an embodiment of the system, the plurality of configuration settings comprises at least one of: a security setting that was implemented by the first virtual machine; a network setting that was implemented by the first virtual machine; an encryption setting that was implemented by the first virtual machine; or an application behavioral setting that was implemented by the first virtual machine.

In an embodiment of the system, the second virtual machine is configured to apply a filtering rule to the plurality of configuration settings to determine a subset of configuration settings that are applicable to the second virtual machine.

In an embodiment of the system, the filtering rule is provided to the second virtual machine by the cloud-based service.

In an embodiment of the system the one or more servers further comprise the mobile device manager, the mobile device manager configured to: receive a second configuration request from the second virtual machine; and provide, to the second virtual machine, a second plurality of configuration settings that are specific to the second virtual machine.

In an embodiment of the system, the second plurality of configuration settings comprises at least one of: a certificate to be applied by the second virtual machine; or a virtual proxy network setting to be implemented by the second virtual machine.

A computer-readable storage medium having program instructions recorded thereon that, when executed by at least one processor of a computing device, perform a method, by a configuration service, for bypassing a mobile device manager during configuration of a child virtual machine. The method includes receiving a plurality of configuration settings that were applied by the mobile device manager to a first virtual machine instantiated by a cloud-based service; providing a notification to the cloud-based service that indicates that the cloud-based service is permitted to instantiate a second virtual machine, the second virtual machine being a child of the first virtual machine; receiving a configuration request from the second virtual machine; and providing the plurality of configuration settings that were applied to the first virtual machine to the second virtual machine for application thereby.

In an embodiment of the computer-readable storage medium, providing the notification to the cloud-based service comprises: receiving an indication that the parent virtual machine was successfully configured in accordance with the configuration settings; and providing the notification to the cloud-based service in response to receiving the indication.

In an embodiment of the computer-readable storage medium, the method further comprises: receiving additional configuration settings from the first virtual machine; and providing the additional configuration settings to the second virtual machine for application thereby.

In an embodiment of the computer-readable storage medium, the cloud-based service is a virtual desktop application platform as a service.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method comprising:
   receiving configuration settings applied by a mobile device manager to a first virtual machine;
   providing a notification to a service, the notification indicating that the service is permitted to instantiate a second virtual machine that is a child of the first virtual machine; and
   providing the configuration settings to the second virtual machine for application to the second virtual machine.

2. The method of claim 1, wherein the configuration settings applied to the first virtual machine are received in response to a determination that the first virtual machine is in a steady state.

3. The method of claim 1, wherein:
   the first virtual machine is instantiated by the service; and
   the service is a cloud-based service.

4. The method of claim 3, wherein the cloud-based service is a virtual desktop service for instantiating virtual machines.

5. The method of claim 1, wherein the configuration settings comprise at least one of:
   a security setting;
   a network setting;
   an encryption setting; or
   an application behavioral setting.

6. The method of claim 1, further comprising:
   receiving an indication that additional configuration settings have been successfully applied to the first virtual machine; and
   providing the additional configuration settings to the second virtual machine.

7. The method of claim 1, further comprising:
   prior to providing the configuration settings to the second virtual machine, receiving a configuration request from the second virtual machine, wherein the configuration request is received in a periodic check-in request by the second virtual machine.

8. A system comprising:
   memory comprising computer executable instructions that, when executed, perform operations comprising:
      receiving first configuration settings applied by a mobile device manager to a first virtual machine;
      providing a notification to a service, the notification indicating that the service is permitted to instantiate a second virtual machine; and
      providing second configuration settings to the second virtual machine for application to the second virtual machine.

9. The system of claim 8, wherein the second virtual machine is a child of the first virtual machine.

10. The system of claim 8, wherein the second virtual machine is a peer of the first virtual machine.

11. The system of claim 8, wherein the second configuration settings are:
    based on the first configuration settings; and
    specific to the second virtual machine.

12. The system of claim 11, the operations further comprising:
    providing third configuration settings to a third virtual machine for application to the third virtual machine, wherein the third configuration settings are:
    based on the first configuration settings; and
    specific to the third virtual machine.

13. The system of claim 12, the operations further comprising:
    receiving an indication that additional configuration settings have been successfully applied to the first virtual machine; and
    providing the additional configuration settings to the second virtual machine and the third virtual machine.

14. A device comprising:
    memory comprising computer executable instructions that, when executed, perform operations comprising:

receiving, by a configuration service, configuration settings applied to a first virtual machine;

providing, by the configuration service, a notification to a service that instantiated the first virtual machine, the notification indicating that the service is permitted to instantiate a second virtual machine; and providing, by the configuration service, the configuration settings to the second virtual machine for application to the second virtual machine.

15. The device of claim 14, wherein, during configuration of the second virtual machine, the configuration service enables bypassing a mobile device manager that applied the configuration settings to the first virtual machine.

16. The device of claim 14, wherein providing the notification to the service comprises:

receiving an indication that the first virtual machine was successfully configured in accordance with the configuration settings; and providing the notification to the service in response to receiving the indication.

17. The device of claim 14, the operations further comprising:

providing, by the configuration service, a notification indicating that the service is permitted to instantiate a third virtual machine; and providing, by the configuration service, the configuration settings to the third virtual machine for application to the third virtual machine.

18. The device of claim 17, wherein the second virtual machine applies a first filtering rule to the configuration settings to determine a first subset of configuration settings that are applicable to the second virtual machine.

19. The device of claim 18, wherein the third virtual machine applies a second filtering rule to the configuration settings to determine a second subset of configuration settings that are applicable to the second virtual machine, the first filtering rule being different from the second filtering rule.

20. The device of claim 14, the operations further comprising:

determining, by the configuration service, whether the configuration settings provided to the second virtual machine were successfully applied to the second virtual machine; and when it is determined that the configuration settings were successfully applied to the second virtual machine, providing a notification to the service indicating that the second virtual machine is in a steady state.

* * * * *